Figure 1:
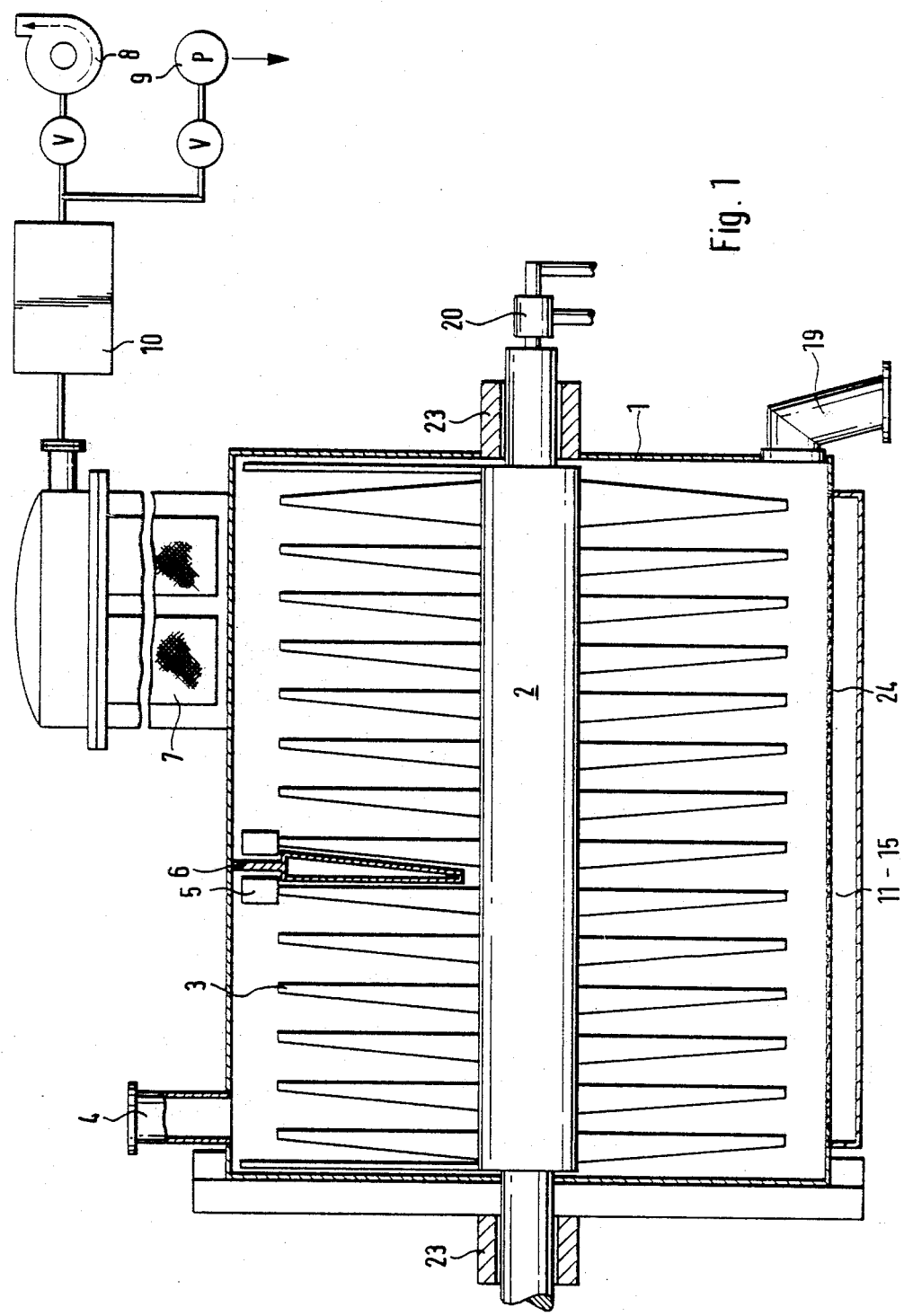

United States Patent [19]

Titus

[11] Patent Number: 4,787,154

[45] Date of Patent: Nov. 29, 1988

[54] SUCTION FILTER-DRIER

[76] Inventor: Hans-Joachim Titus, 11, Av. Princesse Grace, MC 98 Monaco, Monaco

[21] Appl. No.: 60,924

[22] Filed: Jun. 12, 1987

[30] Foreign Application Priority Data

Jun. 12, 1986 [DE] Fed. Rep. of Germany ....... 3619810
Oct. 8, 1986 [DE] Fed. Rep. of Germany ....... 3634197
Oct. 15, 1986 [DE] Fed. Rep. of Germany ....... 3635079

[51] Int. Cl.$^4$ ............................................. F26B 13/30
[52] U.S. Cl. .......................................... 34/92; 34/183
[58] Field of Search ..................... 34/183, 182, 92, 82, 34/76

[56] References Cited

U.S. PATENT DOCUMENTS

| | | | |
|---|---|---|---|
| 3,296,709 | 1/1967 | Bersch | 34/82 |
| 3,701,713 | 10/1972 | Bennett et al. | 34/182 X |
| 3,800,865 | 4/1974 | Onarheilm et al. | 34/183 X |
| 3,889,391 | 6/1975 | Malcolm | 34/182 X |
| 4,276,701 | 7/1981 | Takacs et al. | 34/182 X |
| 4,347,671 | 9/1982 | Dias et al. | 34/92 X |
| 4,589,215 | 5/1986 | Iwasaki et al. | 34/182 |

Primary Examiner—Steven E. Warner
Attorney, Agent, or Firm—Shlesinger, Arkwright & Garvey

[57] ABSTRACT

A suction-filter-drier, in particular for isolating and drying a product from suspension, comprising a closed container having an outer wall and a horizontal axis and including a liquid permeable filter positioned in the container and spaced from the outer wall; and having a plurality of filter chambers disposed between the filter means and the outer wall; and further including a hollow rotatable rotor extending axially through the container with the rotor being oblate in cross-section with a rotor disc supported on the rotor, and including means for selectively oscillating the rotor by imparting a reversely pivoting motion.

41 Claims, 4 Drawing Sheets

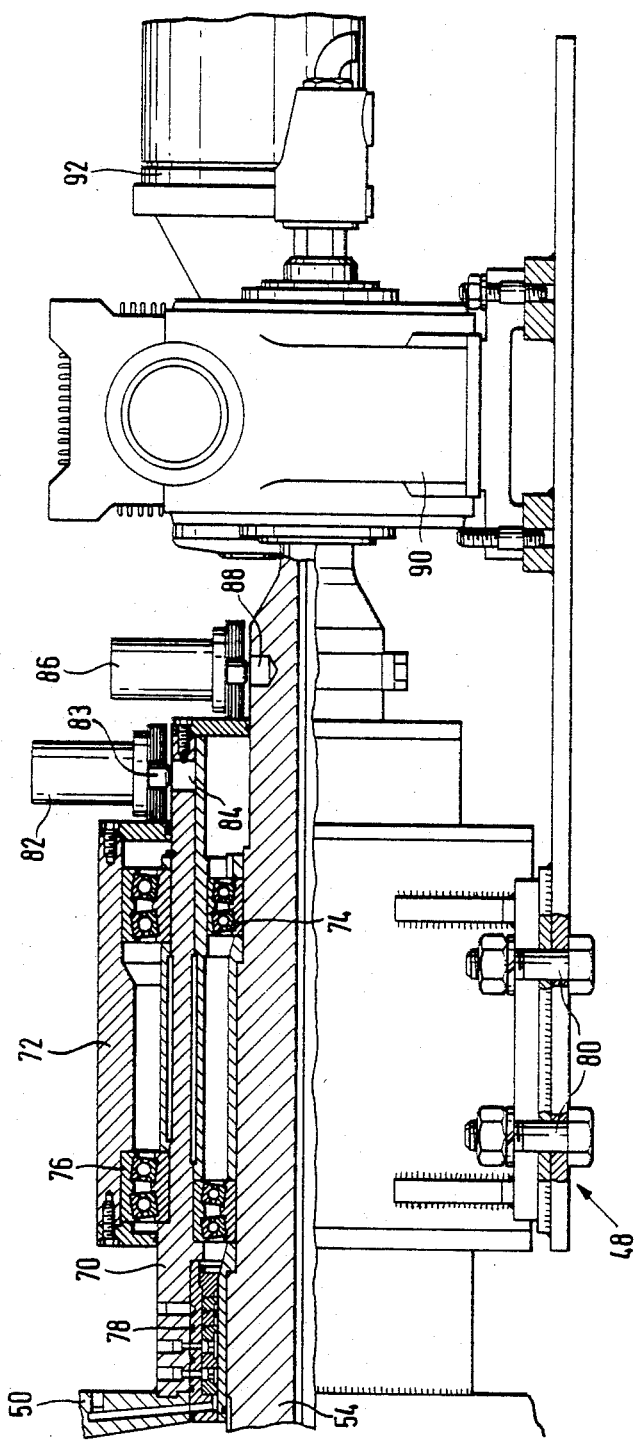

SUCTION FILTER-DRIER

Suction filters are known but achieve only relatively high terminal humidities, while discharging them is difficult on account of such terminal humidity manifesting itself in smeary or viscous manner. The transport of the product to the ensuing drying stage becomes costly as the distance increases and because discontinuous operation requires interim ensiling most of the time. Equipment problems and technical difficulties are substantially raised where sterile products are processed, since no operator may be used.

Operationally long filtration times are required in suction filters because the mother liquor must trickle through the product layer accumulating on the filter surface and beyond a certain cake thickness any mother liquor still present will float a long time on the cake until draining through cracks or channels being formed in the product cake.

When the product is washed, such cracks cause the washing liquid to take the path of least resistance through them, without coming in contact with the product mass to wash it. Remedial smoothing systems used in suction filters merely smooth out the product cake surface, but cannot eliminate the in-depth cracks and channels.

The object of the invention is filtration equipment during the operation of which, beginning with the supply of the suspensions to the equipment and ending with the evacuation of a dry, pneumatically conveyable product, theoretical values of chemical process engineering can be achieved. For that purpose a novel suction filter is combined with a novel drier in such a manner that their operational sequences do not take place sequentially but instead interact and reinforce each other in order to remedy the above described drawbacks.

To solve the above problems, a suction filter-drier of the invention in the main is determined by a horizontal-axis container of which the casing comprises a liquid-permeable, concave filter surface, for instance being curved cylindrically or elliptically inward and generally located in the lower half, and with an outer wall spaced from this casing, this container being divided into a plurality of filter chambers, and by a hollow rotor extending generally axially through the container and supporting heatable rotor disks and driven in swinging manner or in reversibly rotating manner to homogenize the product cake during filtration or to wash and dry the product after isolation.

Thereby a basic drawback of flat filter surfaces with cracks and channels in the cake during filtration, through which the subsequently applied washing liquid will drain without rinsing the mother liquor off the adjoining cake parts, is eliminated. The concave filter surface makes possible unhampered cake formation widely free of cracks because the weight of the product cake rising above the container center presses down laterally along the curved filter surface, whereby any cracks arising are at once closed again. This self-sealing resulting from the product cake's own weight is further enhanced by the low friction of the metal or plastic filter surface and by the smooth surface of the rotor.

Because the cracks or channels in the product cake always are orthogonal to the filter surface if same is plane, the cracks would be radial in the concave filter surface of the invention. The product cake weight prevents cracks from arising precisely in this direction during filtration, whereby the cake can be rinsed with a minimum amount of wash liquid thereafter, and nevertheless very carefully.

The filtration equipment of the invention allows wide matching to various operational conditions and sequences determined by processing different products. In this respect the filter surface can be operated by means of a manifold system leading to the filter chambers and by means of selectively connected vacuum or compressed-gas sources both at excess pressure in the container and external vacuum on one hand or on the other external excess pressure and vacuum or standard pressure in the container.

If the individual supply lines feeding the individual filter chambers are controlled from an electronic test and regulation system through valves, the different need for instance of suction of the lower filter chamber compared to the side filter chambers can be accounted for. Just the way excess suspension or wash water is evacuated above the filter surface, reversely wash liquid can be forced through the filter chambers and filter surface into the container, and where called for the product in the container may furthermore be simultaneously flooded by means of spray nozzles.

In a further embodiment of the invention, about half the end walls of the container of the filtration equipment of the invention are sloping filtration surfaces with filter chambers arranged behind them and laterally joining the curved filter surface of the casing. As a result the product cake is prevented from detaching itself off vertical end walls whereby the product would remain unwashed at the ends of the container, as the wash liquid would seep away and be evacuated unused.

In an important feature of the invention, the rotor is a hollow body with an oblate, for instance oval or elliptical cross-section, which during filtration will compact the product cake from an initial flat position by means of minor, reversing motions, in the absence of smoothing. Thereby and in addition to the compacting effect from the product's own weight in relation to the curved filter surface, there is a compacting effect from the slight compression by the relatively wide rotor acting during its swinging motion on the upper product layers away from the filter surface. This compacting of the product cake taking place in the swinging motion of the rotor homogenizes the product cake and seals in it pores and cracks formed when evacuating the mother liquor. At the same time a gap is created between the rotor and the compacted cake to receive subsequently introduced wash liquid in the container, this liquid being distributed over the cake surface.

Appropriately the rotor is provided on one oblate side with heatable disk segments extending symmetrically up to an arc of 150° and arranged next to one another, which during the pivoting rotor motion remain above the product cake and contribute by their bilateral end surfaces to the described post-compaction. In this sense there is a contribution also from scoops or blades mounted as a radial outer extension of the particular end face at each disk segment.

Furthermore, the disk segments—which are hollow and provided with inner baffles for a heating medium—can be mounted to circuit lines in the rotor and the surfaces of the disk segments can be designed at least in part as filter surfaces, being selectively subjected to suction or to a drying gas by means of manifold lines in the rotor. Besides being meant to compress and to post-compact during filtration, the disk segments also are meant to mix the product during the ensuing drying step or mixing stage, by a motion which is either reversing or only in one direction. The disk segments furthermore accelerate the drying when illustratively they are designed to be filter surfaces and contact drying surfaces crossed by the heating medium.

If in the filtration equipment of the invention the rotor is mounted on a rotor shaft supported in overhung manner in an upright, then the container can be loaded or emptied from the free end side. Also, the container can be removed from the rotor for cleaning and maintenance. Further, the container can be supported in overhung manner by enclosing the rotor shaft with a support sleeve starting at its end side, the container resting on the upright. Optimal conditions are achieved for a container turned by 180° as regards the ensuing drying because the product now dripping from the upper curved filter surface is steadily mixed by the heatable disk segments and where called for can be additionally heated from below by the filter-free but heatable container casing. Simultaneously the filter chambers act as gas filters by means of the curved filter surface parts, being cleaned from the outside by pulses of compressed gas.

When the blades of the disk segments are set, that is when the blade surface deviates from the axial direction of the container, the disk segments depending on the direction of rotation are capable of moving the product from one end of the container to the other and hence through the center, a product shutter where desirable being provided there to automatically discharge the product.

When the rotor is off-center relative to the longitudinal container axis in the downward direction and to such an extent that the blades of the disk segments are a minimum distance away from the lower inside container wall, then the dried product can be discharged automatically to a point of leaving almost no residue through the lower product discharge.

Further features and advantages of the invention are stated in the description below of illustrative embodiments of the invention in relation to the schematic drawings. The individual features of the claims, considered singly or in combination, may form further embodiments of the invention.

Figure 2:
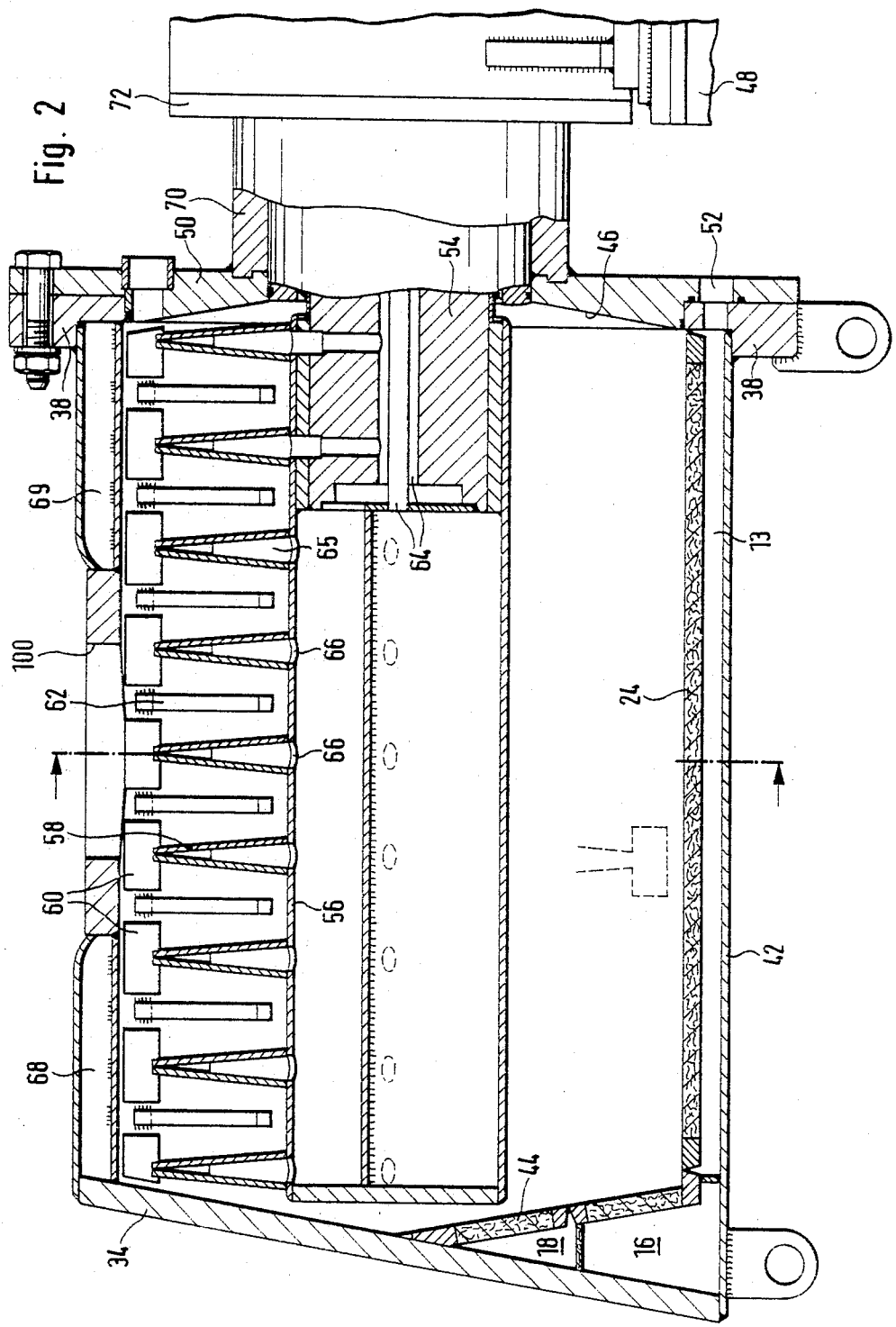
Figure 3:
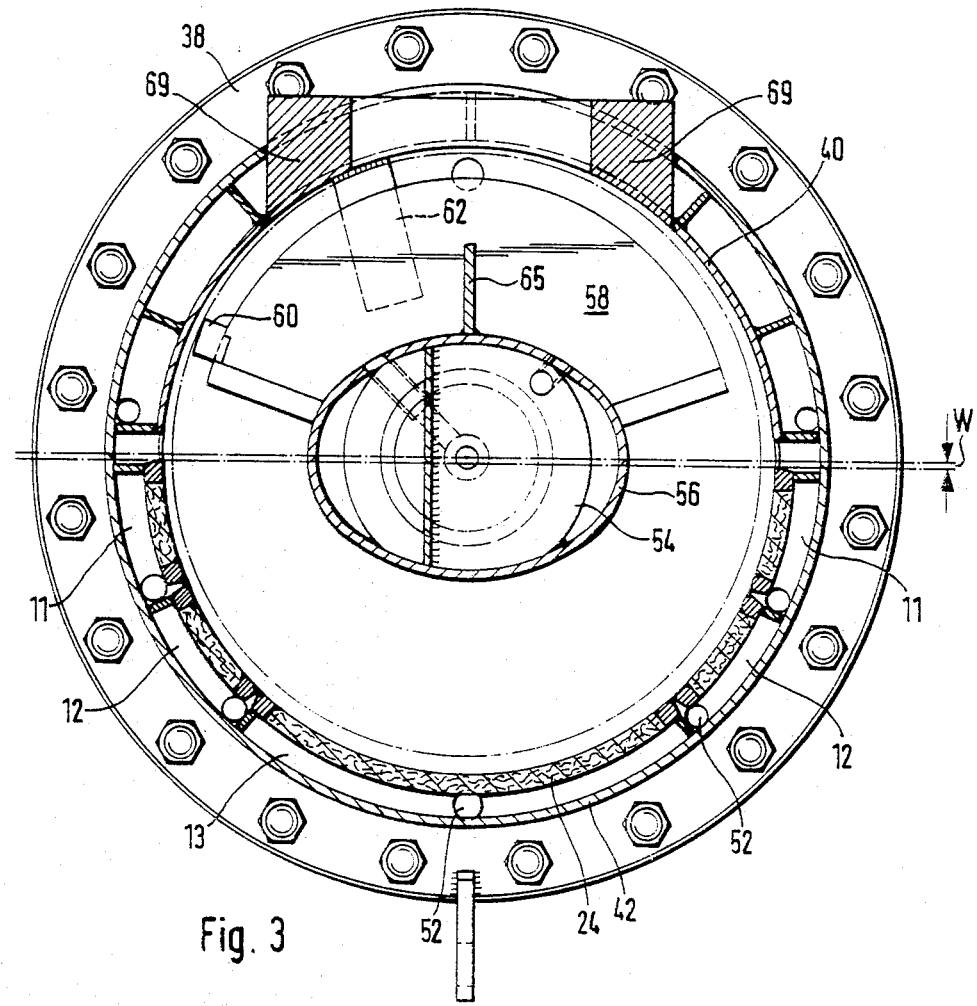

FIG. 1 is a longitudinal section of filtration equipment of the invention in a first embodiment, FIG. 2 is another embodiment of filtration equipment of the invention shown in longitudinal section, FIG. 3 is a cross-section of the equipment of FIG. 2, and FIG. 4 is a longitudinal section of the support for the container and the rotor shaft of FIGS. 2 and 3.

Even though a circular container cross-section allows optimal operation both in filtration and drying in connection with high pressure differences, other container shapes also may be appropriate in special cases.

The double casing is mounted in the lower half of the prone cylindrical container shown in FIG. 1 and is bounded inside by a filter surface 24 and is divided into individual segments that can be vacuum-controlled. To enhance filtration, the container 1 may be subjected to excess pressure. First the container is filled with suspension and depending on its solid content may be subsequently replenished. The filter surface 24 is divided into several filter chambers 11 through 15 shown in greater detail in FIG. 3.

Depending on the kind of cake surface desired at the termination of filtration, the filter chambers are controlled uniformly or differentially. To obtain a plane cake surface from which the surnatant mother liquor also can be evacuated laterally at the end, only the lower filter chamber 13 may be operative after a certain length of time.

If all the filter chambers 11 through 15 are operating uniformly, a trough-like product layer will be formed at the surface. A vacuum test-system determines at the end of filtration which filter surface is not covered with product and sucks in more air than the others, the chamber of that surface then being shut off at once.

Rotor disks 3 are mounted on the heatable rotor shaft 2, their cross-sections being determined for drying and filtration. As the rotor swings to and fro by a few degrees, the product is kept homogeneous in the narrow gap between adjacent rotor disks 3, not locally compacted. Due to the outwardly tapering cross-sections of the rotor disks, a force parallel to the curved filter surface 24 is generated. Scoops or blades 5 mounted to the circumference of the rotor disks remain outside the cake in the upper container half during this filtration, this upper half as shown in FIG. 1 having an intake stub 4, and a filter dome 7 if desired being provided, followed by a condensor 10, an exhaust gas blower 8 and a vacuum pump 9.

After the mother liquor is evacuated, the product is washed once or more, the filtration equipment being used in diverse manner as desired in order to obtain in the shortest possible time a product washed as if processed centrifugally. The container can be flooded using a wash nozzle line (omitted) while simultaneously wash liquid is pressed from outside through the filter surface 24 into the cake. The cake humidified from both sides is thoroughly mixed with wash liquid by the swinging or rotary motions of the rotor disks and blades 5.

To appropriately process products that tend to cake during crystallization, the rotor disks 3 which in this process stage illustratively act as cooling surfaces are rid by stationary wipers 6 of any crystal cakings, only one wiper 6 being shown in FIG. 1 for the sake of simplicity, though as a whole they are seated on a common pivot shaft parallel to the axis and can be pivoted into a rest position adjacent to the container wall. By means of the circulation hook-up 20 outside the shaft support 23 the rotor disks and the rotor shaft can be loaded with a suitable convection medium.

The filtration equipment of FIGS. 2 through 4 is suitable for an alternative drying procedure wherein the container is turned by 180° about its longitudinal axis, whereby the product no longer rests on the filter surface 24 but instead on a semi-cylindrical inner wall 40 mounted in the extension of this surface and is dried by heating the rotor, the double-casing 40-42 divided by axial partition strips 46 into segments, and/or the disk segments 56 mounted on the rotor 54. By means of the filter surface 24, dust from the product is prevented from arriving outside. The filter surface 24 divided into segment chambers can be cleaned from the outside by a pulse of compressed gas. For that purpose, suction hook-ups provided in the closure wall 50 and leading into the filter chambers 11 through 15 may be loaded with compressed gas.

As shown by FIGS. 2 and 3, the rotor shaft 54 inside the container 1 and containing the circulation channels 64 comprises an excentric oval rotor case 56 normally lying flat. Cooling or heating disk segments 58 are mounted on the rotor shaft 54 and as shown by FIG. 3 extend approximately over an arc of 150°, being kept in the upper container part during filtration. The hollow disk segments contain baffles 65 and are connected through apertures 66 in the rotor case to the rotor circulation channels.

During unhampered filtration by means of the concave filter surface 24, no cracks can be generated in the product cake because it is compacted from the side by its own weight. This mechanism is enhanced by a lack of lateral friction, both the filter surface and the rotor being exceedingly smooth. Because cracks in the cake seal themselves, a minimum of wash liquid only is needed after filtration to homogeneously rinse the cake.

When the oblate rotor 54 pivots through an angle between about 15° and 30°, the cake segment extending in the container longitudinal direction is compacted without thereby entailing an undesired smoothing effect closing the pores. Simultaneously a desired gap is created between the rotor shaft and the compacted cake segment to absorb thereafter the wash liquid and to distribute it as uniformly as possible over the entire cake surface. For that purpose, the wash liquid is introduced through the filter chambers 11 through 15 and/or through two wash lines 68, 69 containing (omitted) nozzles.

On account of the generally concave, in particular cylindrically curved filter surface, the cake is perforce much compressed because lacking the opportunity present in plane filter bottoms to escape the pressure from above. Already a partial rotor rotation suffices to completely wring out the cake after the washing is completed and the wash liquid has been evacuated. This takes place without the blades 60 mounted at the ends of the disk segments 58 dipping into the product cake. The blades 60 may be mounted in the extension of the end surfaces of the disk segments 58.

As the rotor shaft 54 can be heated already during filtration, a fine coat of powder will have formed on it before it has begun to rotate, and this coat of powder prevents the product cake from adhering there. The heated disk segments 58 also become active at larger rotor pivot angles and then can be made to contribute to a further compaction of the product cake.

When the product is to be completely rid of its mother liquor while using a minimum of wash liquid, the cake is compacted after evacuation of the mother liquor by swinging the rotor 56 through 15° to 30°, whereby a gap is generated between the oval rotor and the somewhat annularly compacted cake surface; this gap is important for the uniform distribution of the post-filled wash liquid. After washing, the rotor 54 is turned together with the disk segments 58 to initiate drying.

A preparation procedure illustratively for pharmaceutical products begins with separating a crystalline phase from a previously homogeneous solution or also with fermentation, the diverse solution components being introduced into the container. If the products tend to caking during crystallization, the disk segments 58 will be cleaned by means of fixed wipers 62. Otherwise, the rotating disk segments 58 which can be heated during filtration and drying assure advantageous mixing to accelerate the heat exchange.

Outside the filtration zone, a gas cushion introduced through the filter chambers 11 through 15 can be built up to prevent the suspension from passing through the filter surfaces 24 and the crystal from caking, fluidizing the suspension during the crystallization or fermentation, whereby the heat exchange again is accelerated. In fermentation, oxygen can be blown-in through the filter surfaces 24.

The container 1 can be removed from the rotor shaft 54 which as shown in FIGS. 2 through 4 is supported in overhung manner; the container 1 is connected by its flange 38 to a connection plate 50 supported and braced in the upright 48. As a result, when changing products, a visual check is possible on cleaning the rotor and the filter surfaces after the container has been moved to the left in FIG. 2 on a roller track (omitted).

To protect the filter surface 24 from damage by the rotating blades 60 and to decrease the distance between these blades and the closed inner casing 40 after the container has been rotated by 180°, the container is eccentric downward by an amount W relative to the rotor axis as shown in FIG. 3. For that purpose, the closed inner wall 40 is lathed or bored before the filter surface 24 is welded-in. Furthermore the blades 60 of the disk segments 58 are so lathed that a spacing of about 2 mm remains between the blades and the inside wall, allowing to remove the dried product, without leaving any residue behind, through the downward shutter 100, when the container is rotated by 180°.

The shutter 100 admitting the suspension and discharging the product is mounted at the longitudinal center of the container. If the blades 60 on the segments on both sides of the shutter 100 assume oppositely set angles, the rotation of the rotor causes the motion of the product from both container ends toward the middle where it accumulates and is well mixed. For the opposite direction of rotation, the material again will be spread, and this procedure can be repeated at will to achieve mixing. The above described excentricity and the slight distance between the blades and the inner wall 40 allow discharge without any left-behind residues.

A residual layer not seized by the blades is moved from the outside toward the center by (omitted) vibrations. At the same time the vibrators used for discharging also assure that no cracks occur in the product cake during filtration and drying.

If the discharge stub is mounted at the end side illustratively at 19 in FIG. 1, then the filtration equipment can operate as a continuous, feed-through drier if the equipment is rotated by 180°. In that case the roof of the metal filter is cleaned by the blades 60 insofar as the product has not yet dropped. Fine cleaning also can be carried out with pulses of compressed gas through the filter chambers. The blades arranged obliquely relative to the direction of conveyance comprise tapered back sides.

As shown in FIG. 2, approximately the lower half of the container end side is designed to be a slanted filter surface 44 behind which are located the filter chambers 16, 18 equipped with vacuum hook-ups; the filter chambers 16, 18 peripherally adjoin the curved filter surface 24 and are closed on the rear by the end wall 34 which in this case slopes by 15°. As a result, the product layer is prevented from detaching off the wall and the wash liquid cannot drain through the gap without rinsing. The sealing plate 50 on the drive side on the right in FIG. 2 comprises an equivalent slope 46 which can be replaced in the lower container region by a sloped filter surface similarly to the opposite end, this latter filter surface extending approximately to the height of the rotor casing 56, in which case the sealing plate 50 would be replaced by a slanting end wall.

The container pivoting system is integrated into the support and drive side of the filtration equipment shown in FIG. 4. A bearing housing 72 is mounted by bolts 80 to the upright 48. A bearing sleeve 70 rests by means of roller bearings 76 inside the bearing case 72 and is solidly joined to the sealing plate 50. The bearing sleeve 70 supports the rotor shaft 54 by means of its inside and roller bearings 74, a multi-stage shaft packing 78 being provided between the front end of the shaft 54 and the bearing sleeve 70. The rotor shaft 54 is driven by a motor 92 followed by a continuously variable gearing 90 mounted on the upright 48.

A stop cylinder 82 is solidly connected to the bearing housing 72; the piston end 83 of this cylinder cooperates in such manner with a seat 84 of the bearing sleeve 70 that for instance if the piston is advanced by spring force into the seat 84, the container will be held in the filtration position shown in FIG. 2 or in the drying and discharge position reversed by 180°, a second but omitted seat 84 being associated with this drying and discharge position.

A coupling cylinder 86 is mounted to the rear end of the bearing sleeve 70 and cooperates by its piston end with a seat 88 in the rotor shaft 54 so that when the piston is advanced, the coupling cylinder will drive the container into its 180°-rotation or into another motion. At the end of the rotation, the piston of the coupling cylinder 86 is moved back and the piston of the stop cylinder 82 is advanced again.

The described filtration equipment can automatically carry out several sequential process stages, in the order
crystallizing the product from a suspension
filtration with washing
drying
mixing
discharging the dry product and convey to filling station or product silo.

Independently of the container embodiment mode and of container cross-section, the invention encompasses all types of filter surfaces with arbitrary curvatures. Where appropriate, an oval, elliptical or corrugated filter surface can be used in a cylindrical container, regardless of the container shape seen in the longitudinal direction.

I claim:

1. A suction-filter-drier, in particular for isolating and drying products from suspension characterized by a closed container (1) having a horizontal axis, of which the casing comprises generally in its lower half a liquid-permeable, concave, for instance cylindrically or elliptically curved inner filter surface (24) and an outer wall (42) spaced from this surface, this casing being divided into a plurality of filter chambers (11 through 15), and by a hollow rotor (54) generally extending axially through the container and supporting heatable rotor disks means (58) and driven in swinging or in reversible rotating manner to homogenize the product cake during filtration or to wash and to dry the product following isolation and said filter surface (24) operable through a manifold system communicating with the filter chambers (11 through 18) and through selectively connected vacuum or compressed-gas sources both with excess pressure in the container (1) and external vacuum on one hand and on the other with external excess pressure and vacuum or normal pressure in the container.

2. Equipment defined by claim 1, wherein the filter surface (24) consists of metal netting joined by sintering, or of sinter materials joined with metal netting, or of plastic or of arbitrary other filter materials.

3. Equipment define by claim 1, wherein lines (3) feeding the individual filter chambers (11 through 18) are controlled from an electronic test and regulation system through valves.

4. Equipment defined in claim 1, wherein the filter surface (24) can be loaded from a liquid wash source through the manifold line system and wherein the container simultaneously can be flooded by means of spray nozzles in a wash line.

5. Equipment defined in claim 1, wherein approximately half of the container end sides are slanted filter surfaces (44) with filter chambers (16, 18) mounted behind them and adjoining peripherally the curved filter surface (24) of the casing.

6. Equipment defined in claim 1, wherein the hollow disk segments (58) equipped with inner baffles for a heating medium are connected to circulation lines in the rotor (56).

7. Equipment defined in claim 1, wherein the container is pivotably supported by at least 180° on the upright (48) by means of a bearing sleeve (70) issuing from its end side and enclosing the rotor shaft (54).

8. Equipment defined in claim 1, wherein the rotor (56) is fastened on a rotor shaft (54) supported in overhanging manner from an upright (48).

9. Equipment defined by claim 8, wherein the rotor (54) together with the heated disk segments (58) is moved through the product during drying and wherein, when the container (1) is turned by 180°, the filter surface (24) located in the upper container half is operated as a gas-solid filter by pulses of compressed gas similarly to a conventional filter with back cleaning.

10. Apparatus defined in claim 1, wherein a region of the container casing free of filter surfaces (24) continuously adjoins the filter surface and forms the inner wall of a heatable double casing (40, 42).

11. Equipment defined by claim 10, wherein the inner wall (40) opposite the filter surface (24) contains at least one product discharge shutter (100), vibrators being mounted on both sides next to the shutter to move the product from the outer areas into the cent of the container.

12. Equipment defined by claim 10, wherein the rotor (56) and the rotor shaft (54) are offset eccentrically upward relative to the longitudinal axis of the cylindrical container (1) so that the spacing between the blades (60) and the closed container inner wall (40) assumes a minimum value.

13. Equipment defined in claim 12, characterized in that the product can be granulated during drying by means of washing spray-nozzles.

14. Equipment defined in claim 13, characterized in that mixing of the product takes place when the rotor is made to rotate to-and-fro.

15. Equipment defined in claim 14, characterized in that the lower, closed inner wall (40) forms an outer heat exchange surface, especially for cooling, during crystallization.

16. Equipment defined in claim 1, wherein the rotor (56) consists of a hollow body of oblate, for instance oval or elliptical cross-section which in operation compacts the product cake from a flat initial position by means of a reversing pivoting motion through approximately 15° and 30° without inducing a smoothing effect.

17. Equipment defined in claim 16, wherein the rotor (56) supports on an oblate side several disk segments (58) extending next to each other and symmetrically over an arc of up to 150° and remaining during the compacting pivoting motion above the product cake and capable of contributing to after-compaction by means of their bilateral end faces.

18. Equipment defined in claim 17, wherein several scrapers (62) are provided next to one another extending each between adjacent disk segments (58) and where called for being jointly pivotable into a rest position in the container periphery on a pivot shaft supported near the container casing.

19. Equipment defined in claim 17, wherein each disk segment where called for as an outer extension of the particular end face holds at least one blade (60).

20. Equipment defined in claim 19, wherein the blades (60) are set at an angle to the longitudinal direction of the container to transport the product and are streamlined on their back sides.

21. Equipment defined in claim 17, wherein the surfaces of the disk segments (58) are designed at least in part as filter surfaces and are subjected selectively through a manifold line within the rotor (54) to suction or to drying gas.

22. Equipment defined in claim 21, wherein the disk segments (58) consist proportionately of contact drying surfaces crossed by a heating medium and of filter surfaces.

23. A suction-filter-drier, in particular for isolating and drying a product from suspension, comprising:
    (a) a closed container comprising an outer wall, said container having a horizontal axis;
    (b) a liquid permeable filter means positioned in said container and spaced from said outer wall;
    (c) a plurality of filter chambers disposed between said filter means and said outer wall;
    (d) a hollow rotatable rotor extending axially through said container, said rotor being oblate in cross section;
    (e) rotor disk means supported on said rotor; and
    (f) means for selectively oscillating said rotor by imparting a reversely pivoting motion thereto so that a product in said container becomes compacted.

24. A suction-filter-drier, as in claim 23, wherein:
    (a) said filter means is arcuate in cross-section.

25. A suction-filter-drier, as in claim 23, wherein:
    (a) said filter means consists of metal netting joined by sintering, or of sinter netting, or of plastic or of arbitrary other filter materials.

26. A suction-filter-drier, as in claim 23, wherein:
    (a) said container has ends; and
    (b) said filter means has a portion thereof adjacent at least one of said ends and substantially corresponding thereto.

27. A suction-filter-drier, as in claim 23, wherein:
    (a) said means for oscillating said rotor oscillates said rotor through about 15 to 30 degrees from the horizontal major axis of said oblate rotor.

28. A suction-filter-drier, as in claim 23, wherein:
    (a) said container includes an inner wall spaced from said outer wall, at least a portion of said inner wall comprising said filter means.

29. A suction-filter-drier, as in claim 28, wherein:
    (a) said inner wall and said outer wall form an outer heat exchange surface for cooling the product during crystallization thereof.

30. A suction-filter-drier, as in claim 23, and further comprising:
    (a) a manifold system operably associated with said chambers for selectively regulating the pressure therein.

31. A suction-filter-drier, as in claim 30, wherein:
    (a) said manifold system includes means interconnecting with said filter chambers; and
    (b) valve means interposed in said interconnecting means for causing regulation thereof.

32. A suction-filter-drier, as in claim 31, wherein:
    (a) said interconnecting means includes means for feeding water to the product;
    (b) said container includes washing spray nozzles for simultaneously flooding said container in cooperation with the wash water from said interconnection means; and
    (c) said washing spray nozzles include means for granulating the product during drying thereof in said container.

33. A suction-filter-drier, as in claim 23, wherein:
    (a) said disk means includes a plurality of adjacently disposed disk segments, each disk segment subtending an arc of up to 150 degrees, said disk segments mounted on said rotor and disposed opposite said filter means and extending away therefrom, said segments are symmetrically disposed relative to the vertical so that upon oscillation of said rotor the product is not contacted by said segments.

34. A suction-filter-drier, as in claim 33, and including:
    (a) a plurality of wipers;
    (b) a pivot shaft disposed parallel to said horizontal axis; and
    (c) each of said wipers being mounted between two of said segments and on said pivot shaft and said wipers being pivotable therewith.

35. A suction-filter-drier, as in claim 33, wherein:
    (a) said disk segments being hollow and including inner baffles; and
    (b) said rotor includes means communicating with said disk means.

36. A suction-filter-drier, as in claim 33, wherein:
    (a) each disk segment has a filter surface and a heat exchange surface.

37. A suction-filter-drier, as in claim 33, wherein:
    (a) each disk segment includes a first radial edge, a circumferential edge and a second radial edge; and
    (b) each disk segment has a blade positioned on said circumferential edge.

38. A suction-filter-drier, as in claim 37, wherein:
    (a) said blades are angularly disposed relative to said horizontal axis for conveying product upon rotation of said rotor.

39. A suction-filter-drier, as in claim 38, wherein:
    (a) rotor means operably connected to said container for rotating said container at least 180 degrees about said horizontal axis.

40. A suction-filter-drier, as in claim 39, wherein:
    (a) said container includes a product discharge shutter for selectively discharging product.

41. A suction-filter-drier, as in claim 39, wherein:
    (a) said rotor and said rotor means are offset relative to said horizontal axis so that said blades are spaced further from said filter means than from said inner wall as said blades rotate about said horizontal axis.

* * * * *